March 18, 1930.  E. T. FERNGREN  1,750,998
GLASS FEEDING APPARATUS
Filed March 22, 1924  2 Sheets-Sheet 1
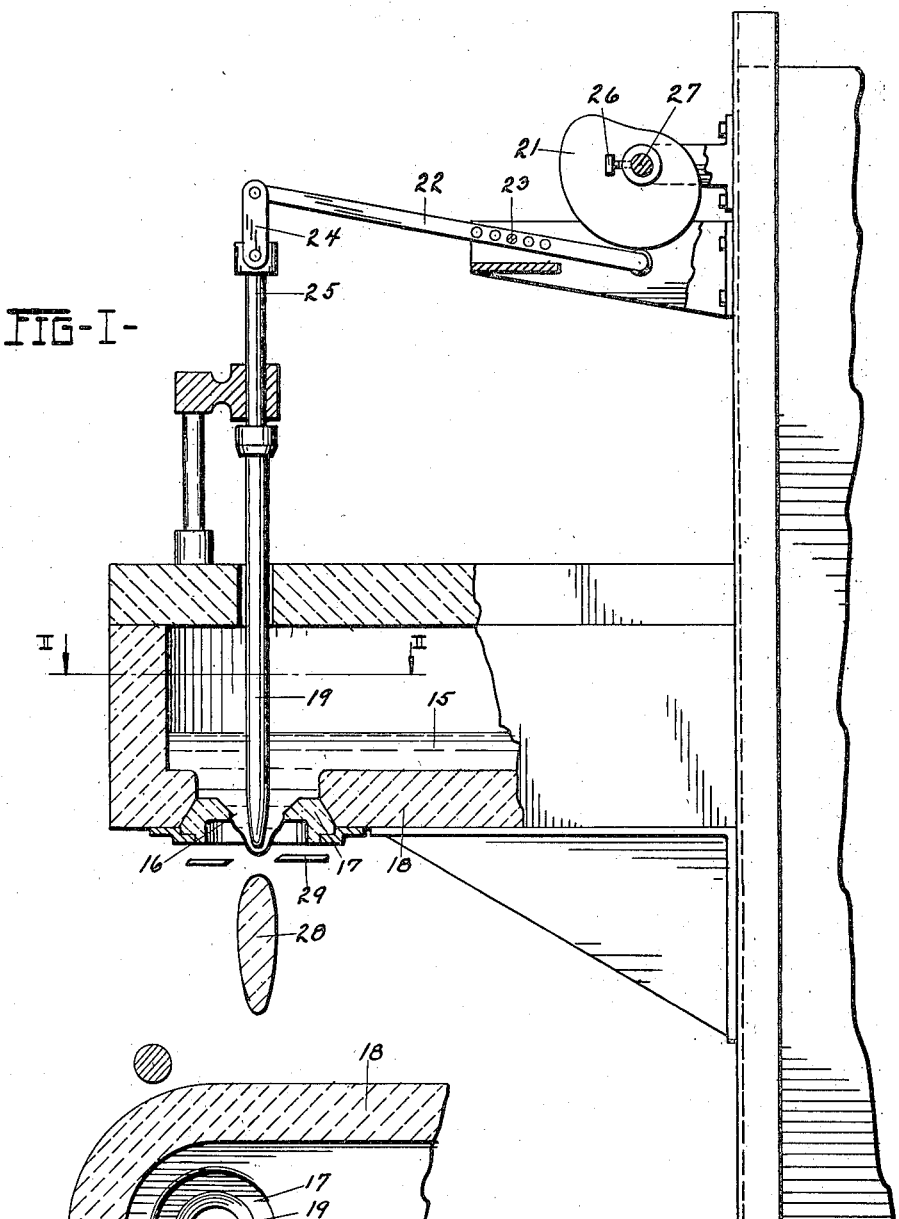
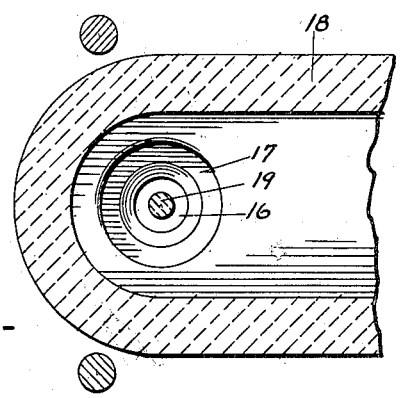
INVENTOR
Enoch T. Ferngren
BY J. F. Rule
HIS ATTORNEY.

March 18, 1930.  E. T. FERNGREN  1,750,998
GLASS FEEDING APPARATUS
Filed March 22, 1924   2 Sheets-Sheet 2
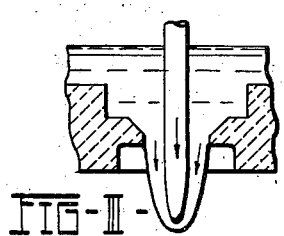
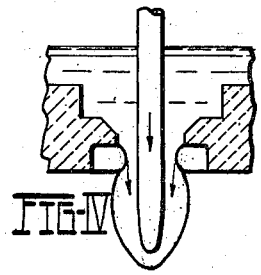
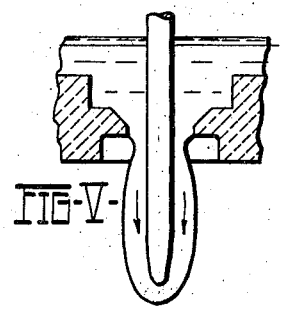
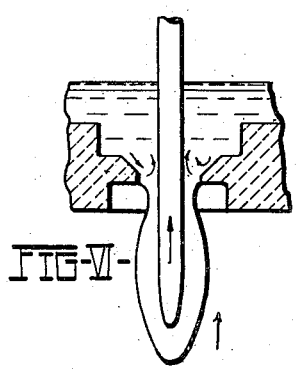
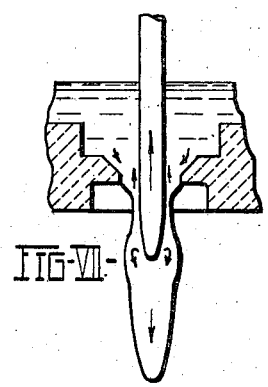
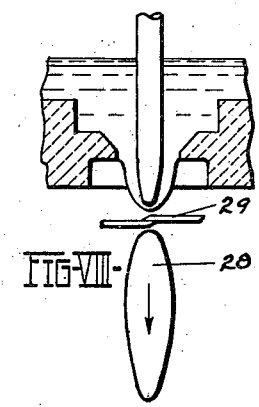
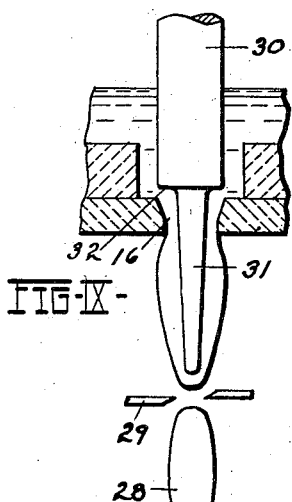
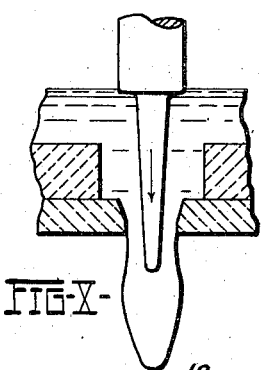
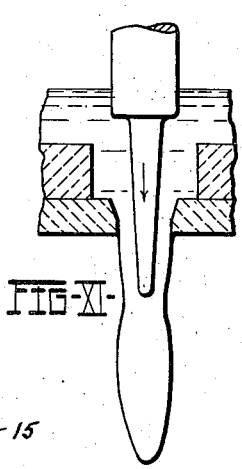
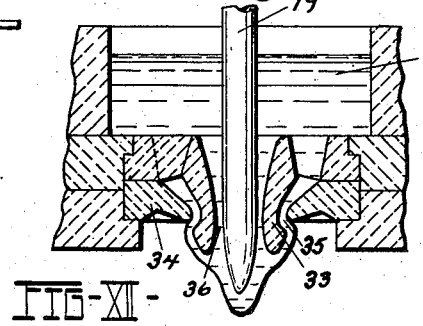
INVENTOR
Enoch T. Ferngren
BY J. F. Rule
HIS ATTORNEY Patented Mar. 18, 1930

1,750,998

UNITED STATES PATENT OFFICE

ENOCH T. FERNGREN, OF TOLEDO, OHIO, ASSIGNOR TO OWENS-ILLINOIS GLASS COMPANY, OF TOLEDO, OHIO, A CORPORATION OF OHIO

GLASS-FEEDING APPARATUS

Application filed March 22, 1924. Serial No. 701,007.

My invention relates to apparatus for shaping and delivering formed masses or mold charges of glass from a supply body of molten glass, and is herein shown in an apparatus belonging to the general class of glass feeders in which the molten glass issues from an outlet in the bottom of a container. In feeders of this class, the discharge of glass is commonly controlled by a regulating plug which projects downwardly into the glass over the outlet and which is periodically reciprocated vertically to exert an alternate expelling and retarding action on the issuing glass.

In accordance with the present invention, I employ a rigid reciprocating plunger-like member or rod, the function and operation of which, however, are substantially different from the usual reciprocating plug above mentioned. In the present invention, the glass is not expelled as a free mass through the orifice, but is accumulated or amassed beneath the orifice and upon the regulating rod which protrudes downward through and beyond the outlet. That is, the regulator rod is not normally used to impel or cause a large volume discharge of glass as in the usual types of plunger feeders, but is principally used as a glass flow equalizing, retarding and amassing agent. The functions and operation of the regulating rod, together with other features of the invention, are more fully pointed out hereinafter.

In the accompanying drawings:

Figure 1 is a part sectional side elevation, partly diagrammatic, of an apparatus constructed in accordance with my invention.

Figure 2 is a sectional plan at the plane of the line II—II on Figure 1.

Figures 3 to 8, inclusive, are diagrammatic views illustrating progressively the formation of a gob, the successive views showing the formation at successive periods during a cycle of movements of the regulating rod.

Figures 9 to 11 are diagrammatic views, showing a modified construction.

Figure 12 shows a further modification.

The molten glass 15 issues through an outlet opening 16 in a bushing 17 removably mounted in the floor of the container 18 which may be the usual furnace boot or forehearth. A regulating rod 19 formed of fire clay or other refractory material, projects downward through the boot and through the orifice 16. The rod is periodically reciprocated vertically by any approved mechanism. As herein shown, a cam 21 operates through a lever 22 having an adjustable fulcrum 23 and connected through a link 24 to the stem 25 of the rod for reciprocating the latter. The cam is secured by means of a set screw 26 to a continuously rotating drive shaft 27, and is rotatively adjustable on the shaft.

The rod 19 is shown in its uppermost position in Figure 1, wherein the lower end of the rod protrudes a short distance below the orifice 16. It is to be noted that the open area formed by the sides of the outlet and the rod is at its maximum in this position. As the rod descends and the open area decreases, it assumes successively the positions shown in Figures 3, 4 and 5, the rod being shown at the limit of its downward movement in Figure 5. The rod then moves upward, as indicated in Figures 6, 7 and 8. During these movements of the rod, the issuing glass is controlled and shaped (as hereinafter described) to form a suspended gob 28 which is severed by shears 29. The shears are automatically operated by any approved mechanism in synchronism with the movements of the forming rod.

In order to obtain the desired uniform quantity in any series of mold changes produced, the glass supply from which the charges are exuded should have a suitable fluency and a certain amount of pressure-head above the discharge opening or orifice, and the diameter of this opening should be made large enough to permit the right quantity of outflow with the regulator rod located therein as shown in the drawings.

The presence of the rod in the center of the cylindrical stream of glass which is thus caused to exude from the supply body will give additional surface for the glass to cling to, so that the glass which is in contact with the rod and adheres thereto will act as sort of a drag-anchor having a tensional reach to all the adjacent glass because of the viscous nature of the glass. For instance, when the rod is moved in the direction of the glass discharge, the central clinging will tend to impart a like stream line velocity to the surrounding cylindrical stream lines of the glass, and in a measure neutralize the retarding action due to the glass which clings to the walls of the discharge orifice. The presence of the rod in the outlet area further provides an open area or annular channel around the rod. Inasmuch as the rod is formed with a tapered terminus, the annular channel bounded by the rod and the sides of the outlet is of variable size, depending upon the position of the said rod.

If the rod in moving downward is advanced at a greater speed than the central portion of a flow of glass through the same size of opening, the exuding movement of glass which surrounds the rod is stimulated in its transit through the orificial portion, but as soon as this glass discharge has passed beyond the confines of the orificial portion, the presence of the rod therein gives considerable support to the body of the flow, preventing acceleration in descent in response to gravity action and thus makes it possible to simultaneously accelerate and retard the same outflow of glass and give a large cross-section to the outflow below the orifice, which is a feature of practical importance.

It may thus be seen, that if the rod is moved through the orifice at the same rate of speed as would be normal for a cylindrical stream line moving along the same plane as the exterior surface of the rod but within a freely discharging flow of glass, that the descending velocity of the entire discharge will become more nearly equal, because the acceleration of movement along the center of the flow will be eliminated, while at the same time considerable support is given to the body of the glass flow beneath the orifice.

The rod, without having any displacing action or exerting any extrusive or impelling pressure on the exuding glass, will counteract the clinging capillary retardation upon the flow from around the inner rim of the orifice and will make equal the quantitative progression of the discharging vein of glass along all its exterior portions adjacent the contact surface next to the walls of the orifice, thus preventing the cause of unequal fluidity in that portion of the discharge which moves close to the walls of the orifice.

The downward travel of the rod may be slightly speeded during the course of its depression through the orifice so as to influence the exuding glass in about the same way as would be normal under gravity discharge, but the downward movement may be progressively slowed down during the progression of the rod, or its velocity progression may be varied, depending upon various factors, such as the fluidity of the glass, its viscosity of body, the static pressure-head over the discharge opening, the normal velocity of discharge before and after exudation from the orifice and the quantity and shape of the gob that is to be formed.

During each advent of the rod towards its lower limit of travel, it will appear to carry forward a relatively large plug of a fluent glass, but in reality the rod is having a retarding grip on the gravity descent of this glass which appears to be suffused thereover and which is in a slow state of movement away from both the orifice and the rod.

As the movement of the rod is arrested, the separation movement of the flowing body of glass from the rod becomes more marked and as the rod is rapidly retracted in opposite direction to the discharging movement, there results, first, a marked check in the descent of the mass formation of glass, and under some conditions even a degree of reversing movement in the discharging glass as the retractive pull of the rod in the center of the flowing formation clashes with and in part overcomes the established inertia of movement plus the gravity acceleration of the flowing mass of glass which is being released from the rod.

During the release of the glass from the rod there results, first, a general vertical drift of the glass along the sides of the rod in a direction opposite to the movement of the rod. As this glass is progressively freed from the receding rod, the adhesion of the glass to the rod causes a general closing up movement from the surrounding glass to fill the space previously occupied by the rod, and in this manner the mold charge is formed and given a cylindrical and elongated form.

In order to prevent undesirable attenuation, the liberated mass of glass should be severed from any connection with the glass on the rod the instant it is formed, unless the downward movement of the rod is immediately resumed an instant before completed liberation of the glass mass from the rod, in which case the body of glass should be severed approximately at the last instant of this movement, just before the rod is at the end of its downward stroke.

The operation of forming each mold charge should proceed about as follows, and as illustrated in Figures 3 to 8 of the drawings:

In Figure 1, the rod is shown at or about its highest position and just at the commencement of its downward travel and in company with the flow discharge of glass which is proceeding from the orifice. During this stage, considerable support is given to the exuded glass and perhaps some acceleration in movement is given to the glass as it issues from the orifice by reason of the large volume discharge beneath the orifice, thus increasing the quantity of discharge through the orifice.

In Figure 4, the rod is shown at the time when it has covered about three-fourths of the distance of its descent. At this particular stage, the support given to the glass by the rod is not sufficient to overcome the gravity of its mass and as a consequence, the flowing glass is progressively shifting its mass and increasing in bulk toward the lower section of the rod with some slight attenuating pull manifesting on the glass which is issuing at the rim or circumference of the orifice, indicating that the movement of the greater portion of the glass beneath the orifice is somewhat speedier than the movement of the rod on the inside thereof.

In Figure 5, the rod is shown at the instant when it has attained its full limit of downward movement and is at rest just a fraction of a second before beginning its receding movement. The issued glass which has thus far accompanied the rod fairly well at about the same rate of movement as that of the rod, is now continuing its movement downward but is as yet partly held by the clinging grip which it has upon the rod, while at the same time some support is given to the exuding glass flow by the now stationary rod and from the rim of the orifice where the continuing acceleration of movement of the depending mass as it starts to slide off from the rod, causes an attenuating pull on the glass which is then issuing from the orifice.

Figure 6 shows the relation of the discharging glass to the rod just about at the instant when the first effect of the retraction of the rod is beginning to be manifest, both on the glass in the orificial portion and on the discharged flow, which, acted upon by its own accumulated momentum and weight, seeks to separate from the rod and also from its source of supply at the orifice.

The movement set up within the glass that surrounds the retreating rod beneath the orifice is two-fold. In this manner, the glass within the body of the discharged portion that is in actual contact with the rod or clinging thereto, moving upward with the rod, while the glass which comprises the bulk of the discharged glass moves downward at an increased ratio of speed after the first arresting effect of the retractive movement is overcome; the upper portion of the gob-like formation sort of crowding down against the lower portion, giving a general increase in the diameter of the glass around the lower portion of the ascending rod. At this particular instant, the same sort of phenomenon in the movement of glass exists at the orifice, where the glass next to the inner surface or rim of the orifice is impelled to discharge partly by the static pressure-head and partly by the pull thereon from the accumulated outflow which is sort of suspended in its surface portion from the glass which lies adjacent to the walls of the orifice, and, therefore, gives a sort of accelerated discharge movement to this glass while at the same time this glass which is also in contact with the rod at the constricted portion of the orifice will follow the movement of the rod upwardly, thus causing a sort of retractional convolution in the glass at the orifice about as indicated by the arrows at this point. The result of this action may either cause a more marked glass discharge than that shown in Figure 6, or else a more noticeable retractive action than shown.

In Figure 7 is illustrated the final formative period when the unit mold charge is nearly formed. At this instant in the recession of the rod, the amassed outflow of glass is nearly separated therefrom and the outflow at the orifice is re-establishing itself against the action of the retractive impulse thereon.

The shape assumed by the glass beneath the rod and around its lower point is given thereto by the clinging grip of the rod upon the interior of its mass, during the rapid upward movement of the rod which causes a concentric closing-in movement from the surrounding glass to occupy the space evacuated by the rod, and during the instant while this movement is in progress the weight of the lower portion of the mold charge causes a progressive elongation of its mass, the lowermost portion thereof having more of an incentive downward than the portion which is immediately beneath the rod where the force of retraction or support given by the rod is still very active.

The mold charge formed by the retraction of the rod as shown in Figure 8 is a rather elongated lump of plastic glass. The plane of severance where this lump is cut off from the glass that remains on the rod, may be as indicated in Figure 8, or the severance may occur after the rod has moved downward with the succeeding charge of glass and, consequently, in a lower plane, in which case the lump of glass should normally be detached just an instant before the rod has reached its lowest point of travel (Fig. 9).

If this latter procedure is followed, the charge obtained is likely to have tapered ends, providing the cutters used for the cutting operation do not unduly interfere with the movement of the glass. However, by regulating operating conditions, any desired shape of the lump of glass within reasonable limits, can be obtained.

During the time the lump of glass or gob is being cut off as in Figure 8, the discharging glass at the orifice by reason of the static pressure-head thereabove, has resumed a more vigorous downward movement in its exterior stream lines adjoining the inner wall of the orifice, gradually obtaining a greater discharging velocity while normally there will be a slight retraction or lift above the plane of severance of that glass which clings to the rod.

The instant the mold charge is trimmed off from the flow, as shown in Figure 8, the rod should start its descending movement and this movement of the rod will then remove the causes for retardation of flow which existed at the orifice during the retractive movement, and as a consequence the glass will flow in large volume from the orifice while its cross-section is retained and its descent retarded by the rod below the orifice.

The quantity of glass discharge obtainable from an opening of the size shown in the drawings would normally be very large without the presence of the rod therein. The rod, therefore, may be considered as a flow-impeding instrument in its most general sense of utility, but this condition of impeding the glass flow may be changed into an impelling action if the movement of the rod during the discharge of the glass should be accelerated to such a point that its clinging or tractive grip-line upon the glass would move at a greater ratio of speed than the cylindrical stream lines of glass discharge there-around, as then the action of the static pressure-head would be reenforced by a dragging action in the direction of discharge.

Figures 9, 10 and 11 illustrate a modified form of reciprocating rod or plunger comprising a body portion 30 of comparatively large diameter and a gob forming rod or portion 31 of smaller diameter projecting through and below the outlet. The body portion 30 where it unites with the rod 31, provides a shoulder 32 whereby the plunger exerts a substantial expelling force on the glass as the plunger descends, and a retarding force or upward pull as the plunger moves upward. The shears 29 are shown in Figure 9 as cutting in a plane below the tip of the forming rod when the latter is in its lowered position. It will be understood, however, that the cutters might be in a higher plane and operate when the rod is in its up position with this form of plunger (as in Fig. 1) or vice versa.

Figure 12 illustrates a further modification in which an auxiliary bushing 33 is interposed between the regulating rod and the bushing 34. This construction provides an annular passageway 35 through which the glass issues, in addition to the annular passageway 36 between the rod 19 and bushing 33. The glass issuing through the outer annular passageway 35 unites with that flowing through the inner passageway 36 and also comes within the influence and control of the regulating rod 19.

Other modifications may be resorted to within the spirit and scope of my invention.

What I claim is:

1. Glass feeding apparatus comprising, in combination, a container for molten glass having an inner outlet orifice and an outer outlet orifice surrounding and spaced from the inner orifice, and means to periodically vary the open area of the inner orifice.

2. Glass feeding apparatus comprising, in combination, a container for molten glass having an inner outlet orifice and an outer concentric outlet orifice surrounding and spaced from the inner orifice, and means to periodically vary the open area of the inner orifice.

3. Glass feeding apparatus comprising, in combination, a container for molten glass having an inner outlet orifice and an outer annular concentric outlet orifice spaced from and surrounding the inner orifice, and means to periodically vary the open area of the inner orifice.

4. Glass feeding apparatus comprising, in combination, a container for molten glass having an inner outlet orifice surrounded by an annular outlet orifice, a regulating rod projecting downward through the inner orifice, and means to reciprocate the rod vertically.

5. Glass feeding apparatus comprising, in combination, a container for molten glass having an inner outlet orifice surrounded by an annular outlet orifice, a regulating rod projecting downward through the inner orifice, and means to reciprocate the rod vertically, the portion of the rod which works in the orifice being tapered and thereby operative to vary the open area of the inner orifice.

6. The combination of a container for molten glass provided with an outlet opening, means to periodically regulate and control the issuance of glass through said opening, and means providing an annular outlet opening surrounding the first mentioned opening.

Signed at Toledo, in the county of Lucas and State of Ohio, this 19th day of March, 1924.

ENOCH T. FERNGREN.